(12) United States Patent
Tanaka et al.

(10) Patent No.: US 7,795,170 B2
(45) Date of Patent: Sep. 14, 2010

(54) CATALYST

(75) Inventors: Hirohisa Tanaka, Shiga (JP); Isao Tan, Shiga (JP); Mari Uenishi, Shiga (JP); Masashi Taniguchi, Shiga (JP); Mareo Kimura, Shizuoka (JP); Satoshi Matsueda, Shizuoka (JP); Akimasa Hirai, Shizuoka (JP); Keiichi Narita, Shizuoka (JP)

(73) Assignees: Daihatsu Motor Co., Osaka (JP); Cataler Corporation, Shizuoka (JP)

( * ) Notice: Subject to any disclaimer, the term of this patent is extended or adjusted under 35 U.S.C. 154(b) by 0 days.

(21) Appl. No.: 12/227,858

(22) PCT Filed: Apr. 23, 2007

(86) PCT No.: PCT/JP2007/058743

§ 371 (c)(1),
(2), (4) Date: Dec. 1, 2008

(87) PCT Pub. No.: WO2007/138807

PCT Pub. Date: Dec. 6, 2007

(65) Prior Publication Data

US 2009/0253574 A1    Oct. 8, 2009

(30) Foreign Application Priority Data

Jun. 1, 2006    (JP) .............................. 2006-153109

(51) Int. Cl.
*B01J 23/10* (2006.01)
(52) U.S. Cl. ...................................... 502/304; 502/308
(58) Field of Classification Search ................. 502/304, 502/308
See application file for complete search history.

(56) References Cited

U.S. PATENT DOCUMENTS

| | | | |
|---|---|---|---|
| 4,849,398 A * | 7/1989 | Takada et al. ............... | 502/303 |
| 6,017,504 A * | 1/2000 | Kaliaguine et al. .......... | 423/263 |
| 6,060,420 A | 5/2000 | Munakata et al. | |
| 6,129,862 A | 10/2000 | Munakata et al. | |
| 2005/0249653 A1 * | 11/2005 | Tanaka et al. ............... | 423/263 |

FOREIGN PATENT DOCUMENTS

| | | |
|---|---|---|
| EP | 1 728 766 A1 | 12/2006 |
| EP | 1 854 538 A1 | 11/2007 |
| EP | 1 958 692 A1 | 8/2008 |
| JP | 2003-175337 | 6/2003 |
| JP | 2007-160149 | 6/2007 |
| WO | WO 2005/090238 A1 | 9/2005 |
| WO | WO 2006/095557 A1 | 9/2006 |

OTHER PUBLICATIONS

Nguyen Van Tuyan et al., "Ineraction of Hydrogen with perovskite-supported metal catalysts", Kinetics and Catlysis, vol. 37, No. 4, Jul.-Aug. 1996, Russia.
Nishihata et al. "Self-regeneration of a Pd-perovskite catalyst for automotive emissions control", Nature vol. 418, No. 6894, pp. 164-167, Jul. 11, 2002, Japan.

* cited by examiner

*Primary Examiner*—Timothy C Vanoy
*Assistant Examiner*—Michelle Hou
(74) *Attorney, Agent, or Firm*—Jean C. Edwards, Esq.; Akerman Senterfitt

(57) ABSTRACT

Provided is a catalyst with a noble metal efficiently supported on the surfacemost thereof. A composite oxide-containing layer is formed on a catalyst carrier so as to contain a perovskite-type composite oxide represented by the following general formula (1) and an other composite oxide, and a noble metal layer is further formed on the catalyst carrier so as to be supported on the surfacemost of the catalyst carrier by immersing the catalyst carrier formed with the composite oxide-containing layer in an aqueous noble metal salt solution to impregnate the catalyst carrier with the aqueous noble metal salt solution:

$$A_xB_yO_{3\pm\delta} \quad (1)$$

(wherein A represents at least one element selected from rare earth elements and alkaline earth metals; B represents at least one element selected from transition elements (excluding rare earth elements); x represents an atomic ratio of less than 1; y represents an atomic ratio of 1.0; and δ represents an oxygen excess or an oxygen deficiency.)

9 Claims, No Drawings

CATALYST

CROSS-REFERENCE TO RELATED APPLICATIONS

The present invention is a 35 USC 371 national stage entry of PCT/JP2007/058743, filed Apr. 23, 2007, which claims priority from Japanese Patent Application No. 2006-153109, filed Jun. 1, 2006, the contents of which are herein incorporated by reference in their entirety.

TECHNICAL FIELD

The present invention relates to a catalyst, and more specifically to a catalyst used as a reaction catalyst for vapor or liquid phase.

BACKGROUND ART

Conventionally, catalysts containing a perovskite-type composite oxide having a crystal structure of a general formula $ABO_3$ have been known as exhaust gas purifying catalysts for internal combustion engines.

For example, it has been reported that a perovskite-type composite oxide composed of $La_{1.00}Fe_{0.57}CO_{0.38}Pd_{0.05}O_3$, in which lanthanum (La) is coordinated on the A site, and cobalt (Co) and palladium (Pd) are coordinated on the B site in the general formula $ABO_3$, reversibly introduces or extracts Pd to or from a perovskite-type crystal structure corresponding to oxidation-reduction change of emissions, and suppresses grain growth and maintains high catalytic activity over a long period of time because of such a self-regenerative function (see, for example, the following Non-Patent Document 1).

However, in order to achieve the self-regeneration function of Pd of the perovskite-type composite oxide of a general formula $AB_{(1-y)}Pd_yO_3$, in which Pd is coordinated on the B site, it is necessary to form a solid solution of Pd at a high rate in the perovskite-type crystal structure. Therefore, for example, a perovskite-type composite oxide represented by the following general formula (20), in which the atomic ratio of the element on the A site exceeds 1, has been proposed (see, for example, the following Patent Document 1).

$$A_xB_{(1-y)}Pd_yO_{3+\delta} \qquad (20)$$

(wherein A represents at least one element selected from rare earth elements and alkaline earth metals; B represents at least one element selected from transition elements (excluding rare earth elements and Pd), Al and Si; x represents an atomic ratio satisfying the following condition: $1<x$; y represents an atomic ratio satisfying the following condition: $0<y\leq 0.5$; and $\delta$ represents an oxygen excess.

Non-Patent Document 1: Y. Nishihata et al., Nature, Vol. 418, No. 6894, pp. 164-167, 11 Jul. 2002

Patent Document 1: International Patent Publication No. WO 2005/090238

DISCLOSURE OF THE INVENTION

Problems to be Solved

On the other hand, when the above-mentioned perovskite-type composite oxide is used, for example, as an exhaust gas purifying catalyst for internal combustion engines, a noble-metal layer made of noble metal may be further provided on the surfacemost of a catalyst carrier provided with a layer of composite oxide containing the perovskite-type composite oxide. In such a case, the catalyst carrier provided with the composite oxide layer is immersed in an acidic solution such as aqueous nitrate solution containing a noble metal to impregnate the catalyst carrier with the aqueous nitrate solution, thereby supporting the noble metal on the surfacemost of the catalyst carrier.

However, when the composite oxide layer containing the perovskite-type composite oxide described in the patent document 1 is immersed in an acidic solution, the element excessively coordinated on the A site elutes into the acidic solution, which reduces the acidity of the acidic solution containing the noble metal. As a result, the efficiency of supporting the noble metal is disadvantageously reduced.

An object of the present invention is to provide a catalyst with a noble metal efficiently supported on the surfacemost thereof.

Means for Solving the Problem

In order to attain the aforementioned object, the catalyst of the present invention contains a composite oxide-containing layer containing a perovskite-type composite oxide represented by the following general formula (1); and a noble-metal layer made of a noble metal supported on a surfacemost thereof:

$$A_xB_yO_{3\pm\delta} \qquad (1)$$

(wherein A represents at least one element selected from rare earth elements and alkaline earth metals; B represents at least one element selected from transition elements (excluding rare earth elements); x represents an atomic ratio of less than 1; y represents an atomic ratio of 1.0; and $\delta$ represents an oxygen excess or an oxygen deficiency.)

Further, in the catalyst of the present invention, it is preferable that the perovskite-type composite oxide is represented by the following general formula (2):

$$A_xB_{1-z}N_zO_{3\pm\delta} \qquad (2)$$

(wherein A represents at least one element selected from rare earth elements and alkaline earth metals; B represents at least one element selected from transition elements (excluding rare earth elements and noble metals); N represents at least one element selected from noble metals; x represents an atomic ratio of less than 1; z represents an atomic ratio satisfying the following condition: $0<z\leq 0.5$; and $\delta$ represents an oxygen excess or an oxygen deficiency.)

Further, in the catalyst of the present invention, it is preferable that x in the general formula (1) represents an atomic ratio satisfying the following condition: $0.8\leq x<1.0$.

Further, in the catalyst of the present invention, it is preferable that A in the general formula (1) is at least one element selected from Ca, Sr, and Ba.

Further, in the catalyst of the present invention, it is preferable that B in the general formula (1) is at least one element selected from Ti and Zr.

Further, in the catalyst of the present invention, it is preferable that N in the general formula (2) is at least one element selected from Pt and Rh.

Further, in the catalyst of the present invention, it is preferable that an amount of the noble metal supported on the noble-metal layer is in a range of 0.05 to 0.7 g/L.

Effect of the Invention

In the catalyst of the present invention, the atomic ratio of the element coordinated on the A site in the perovskite-type composite oxide is less than 1, so that a noble metal is efficiently supported on the surfacemost thereof. Therefore, an excellent catalytic activity can be exhibited.

EMBODIMENT OF THE INVENTION

The catalyst of the present invention includes a composite oxide-containing layer and a noble-metal layer.

The composite oxide-containing layer contains a perovskite-type composite oxide represented by the following general formula (1) and, if necessary, a composite oxide other than the perovskite-type composite oxide (hereinafter referred to as "other composite oxide(s)" in some cases):

$$A_xB_yO_{3\pm\delta} \qquad (1)$$

(wherein A represents at least one element selected from rare earth elements and alkaline earth metals; B represents at least one element selected from transition elements (excluding rare earth elements); x represents an atomic ratio of less than 1; y represents an atomic ratio of 1.0; and δ represents an oxygen excess or an oxygen deficiency.)

In the perovskite-type composite oxide of the general formula (1), A is coordinated on the A site and B is coordinated on the B site.

Examples of the rare earth element represented by A in the general formula (1) include Sc (scandium), Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium) and Lu (lutetium).

These may be used alone or in combination of two or more kinds.

Examples of the alkaline earth metal represented by A in the general formula (1) include Be (beryllium), Mg (magnesium), Ca (calcium), Sr (strontium), Ba (barium) and Ra (radium).

These may be used alone or in combination of two or more kinds.

Among these elements represented by A, alkaline earth metals are preferable, or Ca, Sr, and Ba are more preferable.

The atomic ratio of A, represented by x, is less than 1, namely, x satisfies the following condition: x<1, and more specifically, x satisfies the following condition: 0.8≦x<1, or preferably 0.9≦x<1.

If x is 1 or more, it is difficult to suppress elution of the element represented by A when the composite oxide-containing layer is immersed in an aqueous noble metal salt solution during the formation of the noble-metal layer. Such elution of the element represented by A reduces the acidity of the aqueous noble metal salt solution, failing to efficiently support the noble metal.

The transition element represented by B in the general formula (1) is other than rare earth elements, and examples thereof include, in the Periodic Table of Elements (IUPAC, 1990), elements (excluding rate earth elements) having atomic numbers of 22 (Ti) through 30 (Zn), atomic numbers of 40 (Zr) through 48 (Cd), and atomic numbers 72 (Hf) through 8.0 (Hg).

These may be used alone or in combination of two or more kinds.

Among these elements represented by B, a noble metal and a transition element (excluding noble metals and rare earth elements are preferably used in combination.

Examples of the noble metal include Ru (ruthenium), Rh (rhodium), Pd (palladium), Ag (silver), Os (osmium), Ir (iridium), Pt (platinum), and Au (gold), and Rh and Pt are preferable.

These may be used alone or in combination of two or more kinds.

Examples of the transition element to be used in combination with the noble metal include those listed above excluding noble metals and rare earth elements, and Ti (titanium), Cr (chromium), Mn (manganese), Fe (iron), Co (cobalt), nickel (nickel), Cu (copper), Zn (zinc), and Zr (zirconium) are preferable.

These may be used alone or in combination of two or more kinds.

The atomic ratio of B, represented by y, is 1.0.

In the general formula (1), δ represents an oxygen excess or an oxygen deficiency, and is represented by 0 or a positive number. More specifically, δ represents an excessive atomic ratio or deficient atomic ratio of oxygen atoms caused by allowing the element coordinated on the A site to be excessive or deficient corresponding to the theoretical constituent ratio of a perovskite-type composite oxide of A:B:O=1:1:3.

In view of the foregoing, in the present invention, the perovskite-type composite oxide is suitably represented by the following general formula (2):

$$A_xB_{1-z}N_zO_{3\pm\delta} \qquad (2)$$

(wherein A represents at least one element selected from rare earth elements and alkaline earth metals; B represents at least one element selected from transition elements (excluding rare earth elements and noble metals); N represents at least one element selected from noble metals; x represents an atomic ratio of less than 1; z represents an atomic ratio satisfying the following condition: 0<z≦0.5; and δ represents an oxygen excess or an oxygen deficiency.)

In the perovskite-type composite oxide of the general formula (2), A is coordinated on the A site, and B and N are coordinated on the B site.

The rare earth element and the alkaline earth metal represented by A and the noble metal represented by N, in the general formula (2), include rare earth elements, alkaline earth metals, and noble metals, all explained in the general formula (1), respectively.

The transition element represented by B in the general formula (2) includes transition elements excluding rare earth elements and noble metals, or transition elements further excluding noble metals from the transition elements excluding rare earth elements described above. Among them, Ti, Cr, Mn, Fe, Co, Ni, Cu, Zn, and Zr are preferable, or Ti and Zr are more preferable.

These may be used alone or in combination of two or more kinds.

x in the general formula (2) is defined as in the above-mentioned general formula (1).

In the general formula (2), the atomic ratio of N, represented by z, satisfies the following condition: for example, 0<z≦0.5, or preferably 0<z≦0.2. When z exceeds 0.5, it may be difficult to form a solid solution of the noble metal represented by N, and an increase in cost cannot be avoided.

In the general formula (2), the atomic ratio of B, represented by 1-z, satisfies the following condition: for example, 0.5≦1-z<1, or preferably 0.8≦1-z<1.

δ in the general formula (2) is defined as in the general formula (1).

Further, in the present invention, the perovskite-type composite oxide can also support a noble metal. That is, the perovskite-type composite oxide may contain a noble metal as composition, or may support a noble metal.

The noble metal-supporting perovskite-type composite oxide is represented by the following general formula (3):

$$N/A_xB_yO_{3\pm\delta} \qquad (3)$$

(wherein N represents at least one element selected from noble metals; A represents at least one element selected from rare earth elements and alkaline earth metals; B represents at least one element selected from transition elements (excluding rare earth elements); x represents an atomic ratio of less than 1; y represents an atomic ratio of 1.0; and δ represents an oxygen excess or an oxygen deficiency.)

In the general formula (3), the noble metal represented by N and the transition element (excluding rare earth elements) represented by B include the noble metals and the transition elements (excluding rare earth elements) represented by the general formula (2), respectively. The rare earth element and the alkaline earth metal represented by A include the rare earth elements and the alkaline earth metals represented by the general formula (1), respectively. Each of the noble metals, the transition elements (excluding rare earth elements), the rare earth elements, and the alkaline earth metals may be used alone or in combination of two or more kinds.

Each of x, y, and δ in the general formula (3) is defined as represented by the general formula (1).

The perovskite-type composite oxide represented by the above-mentioned general formula (1) is not particularly limited, and can be produced by an appropriate method for preparing a composite oxide, such as a coprecipitation method, a citrate complex method, and an alkoxide method, for example, according to the description in paragraphs [0039] to [0059] of Japanese Unexamined Patent Publication No. 2004-243305.

In addition, the perovskite-type composite oxide represented by the above-mentioned general formula (3) can be produced, for example, by supporting a noble metal on the perovskite-type composite oxide represented by the general formula (1), which has been produced by the above-mentioned method, according to the description in paragraph [0063] of Japanese Unexamined Patent Publication No. 2004-243305.

The amount of the noble metal supported on the perovskite-type composite oxide thus obtained is, for example, in the range of usually 0 to 20 parts by weight, or preferably 0.2 to 5 parts by weight, per 100 parts by weight of the perovskite-type composite oxide.

No particular limitation is imposed on the other composite oxide. Examples thereof include perovskite-type composite oxides other than the perovskite-type composite oxides represented by the above-mentioned general formulae (1) to (3) (hereinafter referred to as "other perovskite-type composite oxide(s)" in some cases) zirconia composite oxides, ceria composite oxides, and aluminas.

The other perovskite-type composite oxide is represented by the following general formula (4):

$$A_xB_yO_{3\pm\delta} \qquad (4)$$

(wherein A represents at least one element selected from rare earth elements and alkaline earth metals; B represents at least one element selected from transition elements (excluding rare earth elements); x represents an atomic ratio of 1 or more; y represents an atomic ratio of 1.0; and δ represents an oxygen excess or an oxygen deficiency.)

More specifically, preferable are other perovskite-type composite oxides containing noble metals as composition, for example, those represented by the following general formula (5):

$$A_xB_{1-z}N_zO_{3\pm\delta} \qquad (5)$$

(wherein A represents at least one element selected from rare earth elements and alkaline earth metals; B represents at least one element selected from transition elements (excluding rare earth elements and noble metals); N represents at least one element selected from noble metals; x represents an atomic ratio of 1 or more; z represents an atomic ratio satisfying the following condition: $0<z\leq0.5$; and δ represents an oxygen excess or an oxygen deficiency.)

Alternatively, preferable are other perovskite-type composite oxides supporting noble metals, for example, those represented by the following general formula (6):

$$N/A_xB_yO_{3\pm\delta} \qquad (6)$$

(wherein N represents at least one element selected from noble metals; A represents at least one element selected from rare earth elements and alkaline earth metals; B represents at least one element selected from transition elements (excluding rare earth elements); x represents an atomic ratio of 1 or more; y represents an atomic ratio of 1.0; and δ represents an oxygen excess or an oxygen deficiency.)

The rare earth elements and the alkaline earth metals represented by A, the transition elements (excluding rare earth elements) and the transition elements (excluding rare earth elements and noble metals) represented by B, and the noble metals represented by N, in the general formulae (4) to (6), include the rare earth elements, the alkaline earth metals and the transition elements (excluding rare earth elements) represented by the general formula (1), the transition elements (excluding rare earth elements and noble metals) represented by the general formula (2), and the noble metals represented by the general formula (2), respectively. Each of the rare earth elements, the alkaline earth metals, the transition elements (excluding rare earth elements), the transition elements (excluding rare earth elements and noble metals), and the noble metals may be used alone or in combination of two or more kinds.

In the general formulae (4) to (6), each of x, y, and δ is defined as represented by the general formula (1), and z is defined as represented by the general formula (2).

These other perovskite-type composite oxides represented by the general formulae (4) to (6) can be produced, for example, in the same manner as for the perovskite-type composite oxides represented by the general formulae (1) to (3), respectively.

The amount of the noble metal supported on the thus-obtained other perovskite-type composite oxide represented by the general formula (6) is, for example, in the range of usually 0 to 20 parts by weight, or preferably 0.2 to 5 parts by weight, per 100 parts by weight of the other perovskite-type composite oxide.

The zirconia composite oxide is represented by the following general formula (7):

$$Zr_{1-(a+b)}Ce_aR_bO_{2-c} \qquad (7)$$

(wherein R represents an alkaline earth metal and/or a rare earth element (excluding Ce); a represents an atomic ratio of Ce; b represents an atomic ratio of R; 1−(a+b) represents an atomic ratio of Zr; and c represents oxygen vacancy.)

The alkaline earth metal represented by R in the general formula (7) includes the alkaline earth metals represented by the general formula (1). The rare earth element represented by R in the general formula (7) include the rare earth elements represented by the general formula (1) (excluding Ce). These alkaline earth metals and these rare earth elements may be used alone or in combination of two or more kinds.

The atomic ratio of Ce, represented by a, is in the range of 0.1 to 0.65, or preferably 0.1 to 0.5.

The atomic ratio of R, represented by b, is in the range of 0 to 0.55 (i.e., R is not an essential component but an optional component to be optionally contained, and if contained, the atomic ratio thereof is 0.55 or less). When the atomic ratio thereof exceeds 0.55, phase separation may occur or other composite oxide phases may be formed.

The atomic ratio of Zr, represented by 1−(a+b), is in the range of 0.35 to 0.9, or preferably 0.5 to 0.9.

Moreover, c represents oxygen vacancy, which means a proportion of vacancy formed in a fluorite-type crystal lattice usually formed via the oxides of Zr, Ce, R, and N.

The zirconia composite oxide is not particularly limited, and can be produced by an appropriate method for preparing a composite oxide, such as a coprecipitation method, a citrate complex method, and an alkoxide method, for example, according to the description in paragraphs [0090] to [0102] of Japanese Unexamined Patent Publication No. 2004-243305.

The zirconia composite oxide can support a noble metal, or can contain a noble metal as composition.

The noble metal-supporting zirconia composite oxide is represented by the following general formula (8):

$$N/Zr_{1-(a+b)}Ce_aR_bO_{2-c} \qquad (8)$$

(wherein R represents an alkaline earth metal and/or a rare earth element (excluding Ce); N represents a noble metal; a represents an atomic ratio of Ce; b represents an atomic ratio of R; 1−(a+b) represents an atomic ratio of Zr; and c represents oxygen vacancy.)

The noble metal-supporting zirconia composite oxide can be produced, for example, by supporting a noble metal on the zirconia composite oxide represented by the general formula (7), which has been produced by the above-mentioned method, according to the description in paragraphs [0122] and of Japanese Unexamined Patent Publication No. 2004-243305.

The amount of the noble metal supported on the zirconia composite oxide thus obtained is, for example, in the range of usually 0.01 to 5 parts by weight, or preferably 0.02 to 2 parts by weight, per 100 parts by weight of the zirconia composite oxide.

On the other hand, the zirconia composite oxide containing a noble metal as composition is represented by the following general formula (9):

$$Zr_{1-(d+e+f)}Ce_dR_eN_fO_{2-g} \qquad (9)$$

(wherein R represents an alkaline earth metal and/or a rare earth element (excluding Ce); N represents a noble metal; d represents an atomic ratio of Ce; e represents an atomic ratio of R; f represents an atomic ratio of N; 1−(d+e+f) represents an atomic ratio of Zr; and c represents oxygen vacancy.)

The atomic ratio of Ce, represented by d, is in the range of 0.1 to 0.65, or preferably 0.1 to 0.5.

The atomic ratio of R, represented by e, is in the range of 0 to 0.55 (i.e., R is not an essential component but an optional component to be optionally contained, and if contained, the atomic ratio thereof is 0.55 or less). When the atomic ratio thereof exceeds 0.55, phase separation may occur or other composite oxide phases may be formed.

The atomic ratio of N, represented by f, is in the range of 0.001 to 0.3, or preferably 0.001 to 0.2.

The atomic ratio of Zr, represented by 1−(d+e+f), is in the range of 0.35 to 0.9, or preferably 0.5 to 0.9.

Moreover, g represents oxygen vacancy, which means a proportion of vacancy formed in a fluorite-type crystal lattice usually formed via the oxides of Zr, Ce, and R.

The zirconia composite oxide containing a noble metal as composition can be produced, for example, according to the description in paragraphs [0090] to [0102] of Japanese Unexamined Patent Publication No. 2004-243305 as described above.

The zirconia composite oxide containing a noble metal as composition can further support a noble metal as described above.

The amount of the noble metal contained in the zirconia composite oxide thus obtained (the total amount of the noble metal contained as composition and the supported noble metal) is, for example, in the range of usually 0.01 to 5 parts by weight, or preferably 0.02 to 2 parts by weight, per 100 parts by weight of the zirconia composite oxide.

The ceria composite oxide is represented by the following general formula (10):

$$Ce_{1-(h+i)}Zr_hL_iO_{2-j} \qquad (10)$$

(wherein L represents an alkaline earth metal and/or a rare earth element (excluding Ce); h represents an atomic ratio of Zr; i represents an atomic ratio of L; 1−(h+i) represents an atomic ratio of Ce; and j represents oxygen vacancy.)

Examples of the alkaline earth metal represented by L in the general formula (10) include the alkaline earth metals represented by the general formula (1). Examples of the rare earth element represented by L include the rare earth elements (excluding Ce) represented by the general formula (1). These alkaline earth metals and these rare earth elements may be used alone or in combination of two or more kinds.

The atomic ratio of Zr, represented by h, is in the range of 0.2 to 0.7, or preferably 0.2 to 0.5.

The atomic ratio of L, represented by i, is in the range of 0 to 0.2 (i.e., L is not an essential component but an optional component to be optionally contained, and if contained, the atomic ratio thereof is 0.2 or less). When the atomic ratio thereof exceeds 0.2, phase separation may occur or other composite oxide phases may be formed.

The atomic ratio of Ce, represented by 1−(h+i), is in the range of 0.3 to 0.8, or preferably 0.4 to 0.6.

Moreover, j represents oxygen vacancy, which means a proportion of vacancy formed in a fluorite-type crystal lattice usually formed via the oxides of Ce, Zr, and L.

The ceria composite oxide can be produced in the same manner as used to produce the above-mentioned zirconia composite oxide.

The ceria composite oxide can support a noble metal, or can contain a noble metal as composition.

The noble metal-supporting ceria composite oxide is represented by the following general formula (11):

$$N/Ce_{1-(h+i)}Zr_hL_iO_{2-j} \qquad (11)$$

(wherein L represents an alkaline earth metal and/or a rare earth element (excluding Ce); N represents a noble metal; h represents an atomic ratio of Zr; i represents an atomic ratio of L; 1−(h+i) represents an atomic ratio of Ce; and j represents oxygen vacancy.)

The noble metal-supporting ceria composite oxide can be produced, for example, by supporting a noble metal on the ceria composite oxide represented by the general formula (10), which has been produced by the above-mentioned method, in the same manner as used to support a noble metal on the above-mentioned zirconia composite oxide.

The amount of the noble metal supported on the ceria composite oxide thus obtained is, for example, in the range of usually 0.01 to 5 parts by weight, or preferably 0.02 to 2 parts by weight, per 100 parts by weight of the ceria composite oxide.

On the other hand, the ceria composite oxide containing a noble metal as composition is represented by the following general formula (12):

$$Ce_{1-(k+l+m)}Zr_kL_lN_mO_{2-n} \qquad (12)$$

(wherein L represents an alkaline earth metal and/or a rare earth element (excluding Ce); N represents a noble metal; k represents an atomic ratio of Zr; l represents an atomic ratio of L; m represents an atomic ratio of N; 1−(k+l+m) represents an atomic ratio of Ce; and n represents oxygen vacancy.)

The atomic ratio of Zr, represented by k, is in the range of 0.2 to 0.7, or preferably 0.2 to 0.5.

The atomic ratio of L, represented by l, is in the range of 0 to 0.2 (i.e., L is not an essential component but an optional component to be optionally contained, and if contained, the atomic ratio thereof is 0.2 or less). When the atomic ratio thereof exceeds 0.2, phase separation may occur or other composite oxide phases may be formed.

The atomic ratio of N, represented by m, is in the range of 0.001 to 0.3, or preferably 0.001 to 0.2.

The atomic ratio of Ce, represented by 1−(k+l+m), is in the range of 0.3 to 0.8, or preferably 0.4 to 0.6.

Moreover, n represents oxygen vacancy, which means a proportion of vacancy formed in a fluorite-type crystal lattice usually formed via the oxides of Ce, Zr, L, and N.

The ceria composite oxide containing a noble metal as composition can be produced in the same manner as used to produce the above-mentioned zirconia composite oxide containing a noble metal as composition.

The ceria composite oxide containing a noble metal as composition can further support a noble metal as described above.

The amount of the noble metal contained in the ceria composite oxide thus obtained (the total amount of the noble metal contained as composition and the supported noble metal) is, for example, in the range of usually 0.01 to 5 parts by weight, or preferably 0.01 to 2 parts by weight, per 100 parts by weight of the ceria composite oxide.

Examples of the alumina include α-alumina, θ-alumina, and γ-alumina, and θ-alumina is preferable.

α-alumina has an α phase as a crystal phase and include, for example, AKP-53 (trade name, high-purity alumina, manufactured by Sumitomo Chemical Co., Ltd.). Such α-alumina can be obtained by a method such as an alkoxide method, a sol-gel method, and a coprecipitation method.

θ-alumina has a θ phase as a crystal phase and is one of intermediate (transition) aluminas before transition to α-alumina. Examples thereof include SPHERALITE 531P (trade name, γ-alumina, manufacture by Procatalyse Co.). Such θ-alumina can be obtained, for example, by heating a commercially available activated alumina (γ-alumina) at 900 to 1100° C. in the atmosphere for 1 to 10 hours.

γ-alumina has a γ phase as a crystal phase and is not particularly limited. Examples thereof include known γ-aluminas used in exhaust gas purifying catalysts.

Further, aluminas obtained by containing La and/or Ba in these aluminas can also be used. Such alumina containing La and/or Ba can be produced according to the description in paragraph [0073] of Japanese Unexamined Patent Publication No. 2004-243305.

These aluminas can support noble metals. The noble metal-supporting alumina can be produced, for example, by supporting a noble metal on the above-mentioned alumina according to the description in paragraphs [0122] and [0126] of Japanese Unexamined Patent Publication No. 2004-243305.

The amount of the noble metal supported on the alumina thus obtained is, for example, in the range of usually 0.01 to 5 parts by weight, or preferably 0.02 to 2 parts by weight, per 100 parts by weight of the alumina.

In the present invention, the composite oxide-containing layer can be formed, for example as monolayer or multilayer (e.g., two, three, or four layers). It is preferably formed so as to have two layers.

In the catalyst of the present invention, the composite oxide-containing layer, when having two layers, is formed with an inner layer and an outer layer formed on the inner layer (surface), and, for example, at least either of the inner and the outer layer contains the perovskite-type composite oxide represented by the general formula (1).

Preferably, the outer layer contains the perovskite-type composite oxide represented by the general formula (1). That is, the inner layer contains the other composite oxide, and the outer layer contains the perovskite-type composite oxide represented by the general formula (1) and the other composite oxide.

More preferably, the inner layer only contains the other composite oxide and the outer layer only contains the perovskite-type composite oxide represented by the general formula (1) and the other composite oxide (e.g., zirconia composite oxide, ceria composite oxide, alumina, etc.).

More specifically, when the composite oxide-containing layer has two layers, the inner layer thereof preferably contains an other perovskite-type composite oxide containing a noble metal as composition, a noble metal-supporting ceria composite oxide, and an alumina, or more preferably contains an other perovskite-type composite oxide containing Pd as composition, a Pt-supporting ceria composite oxide, and a θ-alumina.

Each of the supported amounts of these composite oxides on the inner layer is preferably in the range of 100 to 1000 parts by weight of the noble metal-supporting ceria composite oxide; and 100 to 2000 parts by weight of the alumina, per 100 parts by weight of the other perovskite-type composite oxide containing a noble metal as composition, or more preferably, in the range of 100 to 1000 parts by weight of the Pt-supporting ceria composite oxide; and 100 to 2000 parts by weight of the θ-alumina, per 100 parts by weight of the other perovskite-type composite oxide containing Pd as composition.

Further, when the composite oxide-containing layer has two layers, the outer layer thereof preferably contains a perovskite-type composite oxide containing a noble metal as composition, a zirconia composite oxide containing a noble metal as composition and supporting a noble metal, and an alumina supporting a noble metal. In addition, if necessary, it contains at least one kind selected from the other perovskite-type composite oxides containing noble metals as composition and the ceria composite oxides supporting noble metals.

More preferably, the outer layer thereof contains a perovskite-type composite oxide containing Rh as composition, a zirconia composite oxide containing Rh as composition and supporting Rh, and a θ-alumina supporting Pt and Rh. In addition, if necessary, it contains a perovskite-type composite oxide containing Pt as composition, an other perovskite-type composite oxide containing Pt as composition, and an other perovskite-type composite oxide containing Rh as composition, and at least one kind selected from the ceria composite oxides supporting Pt.

Each of the supported amounts of these composite oxides on the outer layer is preferably in the range of 50 to 2000 parts by weight of the zirconia composite oxide containing a noble metal as composition and supporting a noble metal; 25 to 5000 parts by weight of the alumina supporting a noble metal; if necessary, 20 to 500 parts by weight of the other perovskite-type composite oxide containing a noble metal as composition; and if necessary, 0 to 1000 parts by weight of the ceria composite oxide supporting a noble metal, per 100 parts by weight of the perovskite-type composite oxide containing a noble metal as composition.

Each of the supported amounts thereof is more preferably in the range of 50 to 2000 parts by weight of the zirconia composite oxide containing Rh as composition and supporting Rh; 25 to 5000 parts by weight of the θ-alumina supporting Pt and Rh; if necessary, 20 to 500 parts by weight of the perovskite-type composite oxide containing Pt as composition; if necessary, 0 to 500 parts by weight of the other perovskite-type composite oxide containing Pt as composition; if necessary, 0 to 500 parts by weight of the other perovskite-type composite oxide containing Rh as composition; and if necessary, 0 to 1000 parts by weight of the ceria composite oxide supporting Pt, per 100 parts by weight of the perovskite-type composite oxide containing Rh as composition.

In the composite oxide-containing layer, the amount supported on the inner layer thereof is in the range of, for example, 50 to 250 g, or preferably 100 to 200 g, per 1 liter of the catalyst carrier (described later), while the amount supported on the outer layer thereof is in the range of, for example, 50 to 250 g, or preferably 100 to 200 g, per 1 liter of the catalyst carrier.

The above-mentioned composite oxide-containing layer can be formed, for example, on a catalyst carrier. The catalyst carrier is not particularly limited and known catalyst carriers such as honeycomb monolithic carriers, for example, comprising cordierite are used.

The composite oxide-containing layer may be formed on a catalyst carrier in the following manner. For example, first, water is added to the perovskite-type composite oxide represented by the general formula (1) and the other composite oxide to obtain a slurry. Then, the slurry is applied onto the catalyst carrier, dried at 50 to 200° C. for 1 to 48 hours, and further baked at 350 to 1000° C. for 1 to 12 hours to form the composite oxide-containing layer. Alternatively, the composite oxide-containing layer may be formed on a catalyst carrier in the following manner. Water is added to each of the above-mentioned components to obtain slurries. Then, these slurries are mixed, and the resulting slurry mixture is applied onto the catalyst carrier, dried at 50 to 200° C. for 1 to 48 hours, and further baked at 350 to 1000° C. for 1 to 12 hours to form the composite oxide-containing layer.

The composite oxide-containing layer is formed so as to have two layers in the following manner. First, in the same manner as above, the slurry containing each of the components is applied to the catalyst carrier, dried, and baked to form an inner layer. Then, in the same manner as above, the slurry containing each of the components is applied onto the inner layer, dried, and baked to form an outer layer, so that the composite oxide-containing layer having two layers can be formed.

The noble-metal layer is supported on the surfacemost of the composite oxide-containing layer which is a surfacemost layer.

Examples of the noble metal include those represented by the general formula (2), or Rh and Pt are preferable.

The amount of the noble-metal layer supported is in the range of, for example, 0.05 to 0.7 g, or preferably 0.05 to 0.5 g, per 1 L of the catalyst carrier.

The noble-metal layer may be obtained in the following manner. Water is added to salts of noble metals to dissolve them, to thereby obtain an aqueous noble metal salt solution. The catalyst carrier formed with the above-mentioned composite oxide-containing layer is immersed in the aqueous noble metal salt solution, for example, for 5 to 120 minutes. After being impregnated with the aqueous noble metal salt solution, the catalyst carrier is dried, for example, at 50 to 200° C. for 1 to 48 hours, and then further baked at 350 to 1000° C. for 1 to 12 hours.

Examples of the salts of noble metals (raw materials of noble metals) include salts of the above-mentioned noble metals, and practically, examples of the aqueous noble metal salt solution with these salts dissolved in water include aqueous nitrate solution, dinitrodiamine nitrate solution, and aqueous chloride solution. More specific examples thereof include rhodium salt solutions such as aqueous rhodium nitrate solution and aqueous rhodium chloride solution; palladium salt solution such as aqueous palladium nitrate solution and aqueous palladium chloride solution; and platinum salt solution such as aqueous dinitrodiamine platinum nitrate solution, aqueous chloroplatinic acid solution, and aqueous amine platinum (IV) solution. These noble metal salt solutions may be used alone or in combination of two or more kinds. An aqueous mixed solution of dinitrodiamine platinum nitrate and rhodium nitrate is preferable.

The noble metal salt solution has a concentration, in terms of the noble metal, of 0.01 to 2.0 g/L, or preferably 0.01 to 1.0 g/L, and the pH thereof is set in the range of, for example, 0.01 to 6, or preferably 0.1 to 5.

In the catalyst of the present invention, the composite oxide-containing layer contains a perovskite-type composite oxide in which the atomic ratio of the element coordinated on the A site is less than 1, as represented by the general formula (1). Therefore, the noble metal is efficiently supported on the surfacemost of the catalyst.

Specifically, in the formation of the noble-metal layer, when the atomic ratio x of the element on the A site of the perovskite-type composite oxide represented by the general formula (1) is less than 1, even if the catalyst carrier formed with the composite oxide-containing layer containing the perovskite-type composite oxide is immersed in an acidic aqueous noble metal salt solution, it is suppressed that the element on the A site elutes into the aqueous noble metal salt solution. This prevents the acidity of the aqueous noble metal salt solution from decreasing and allows the noble metal to be efficiently supported on the noble-metal layer. As a result, the catalyst of the present invention can exhibit an excellent catalytic activity.

In particular, when the element coordinated on the A site of the perovskite-type composite oxide is an alkaline earth metal, more specifically, when it is a perovskite-type composite oxide represented by $Ca_xZr_{1-z}N_zO_{3\pm\delta}$ or $Ca_xTi_{1-z}N_zO_{3\pm\delta}$, Ca on the A site may more easily elute into the aqueous noble metal salt solution by immersion in the acidic aqueous noble metal salt solution during the formation of the noble-metal layer.

However, in the catalyst of the present invention, since the composite oxide-containing layer contains $Ca_xZr_{1-z}N_zO_{3\pm\delta}$ or $Ca_xTi_{1-z}N_zO_{3\pm\delta}$ in which the atomic ratio of Ca represented by x is less than 1, it is further suppressed that Ca on the A site elutes into the aqueous noble metal salt solution.

The catalyst of the present invention is not particularly limited and can be used in various industrial fields.

The catalyst of the present invention may be used as is or in combination with other components depending on the purpose and application. The application of the catalyst is not particularly limited and the catalyst can be widely used in the field in which noble metals are used as catalysts. Examples of the catalyst include an organic synthesis reaction catalyst, a reductive reaction catalyst, a hydrogenation catalyst, a hydrogenolysis catalyst, or an exhaust gas purifying catalyst for internal combustion engines.

In particular, when the catalyst is used as an exhaust gas purifying catalyst for internal combustion engines, high catalytic activity can be maintained over a long period of time because of high catalytic activity and self-regenerative function of noble metals, thereby achieving an excellent exhaust gas purifying performance.

Moreover, since the catalyst of the present invention has a noble-metal layer made of noble metal supported on the surfacemost thereof, excellent exhaust gas purifying performance can be achieved without reducing catalytic activity even in environment where catalytic activity tends to reduce, more specifically, when the catalyst is used as an exhaust gas purifying catalyst for internal combustion engines such as gasoline engines or diesel engines mounted in vehicles such as automobiles, having low maximum temperature and low exhaust gas temperature.

EXAMPLES

While in the following, the present invention will be described in further detail with reference to Examples and Comparative Examples, the present invention is not limited to any of them. In Examples and Comparative Examples, the term "content" of the noble metal refers to amounts of any of the noble metals currently supported and the noble metals contained as composition, unless otherwise specified therein.

(1) Production Example 1

Production of Rh/$Zr_{0.777}Ce_{0.160}La_{0.020}Nd_{0.040}Rh_{0.003}$ Oxide Powder A mixed alkoxide solution was prepared by mixing 0.156 mol, in terms of Zr, of zirconium methoxypropylate [$Zr(OCH(CH_3)CH_2OCH_3)_3$], 0.032 mol, in terms of Ce, of cerium methoxypropylate [$Ce(OCH(CH_3)CH_2OCH_3)_3$], 0.004 mol, in terms of La, of lanthanum methoxypropylate [$La(OCH(CH_3)CH_2OCH_3)_3$], 0.008 mol, in terms of Nd, of neodymium methoxypropylate [$Nd(OCH(CH_3)CH_2OCH_3)_3$], and 200 mL of toluene, and dissolving them with stirring. The mixed alkoxide solution was hydrolyzed by adding dropwise 80 mL of deionized water.

Next, the resulting hydrolyzed solution was evaporated to dryness by distilling off toluene and deionized water to obtain a precursor. The precursor was further subjected to forced-air drying at 60° C. for 24 hours, and then subjected to a heat treatment (baking) at 450° C. for 3 hours using an electric furnace, to obtain a powder of zirconia composite oxide represented by $Zr_{0.78}Ce_{0.16}La_{0.02}Nd_{0.04}$ Oxide.

Further, 20 g of the $Zr_{0.78}Ce_{0.16}La_{0.02}Nd_{0.04}$ Oxide powder thus obtained was impregnated with an aqueous rhodium nitrate solution (0.06 g in terms of Rh), dried and then subjected to a heat treatment (baking) at 800° C. for 3 hours using an electric furnace, to obtain a powder of zirconia composite oxide containing Rh as composition represented by $Zr_{0.777}Ce_{0.160}La_{0.020}Nd_{0.040}Rh_{0.003}$ Oxide.

Next, 20 g of the resulting powder was impregnated with an aqueous rhodium nitrate solution (0.04 g in terms of Rh), dried and then baked at 500° C. for 3 hours using an electric furnace, to obtain a powder of zirconia composite oxide represented by Rh-supporting $Zr_{0.777}Ce_{0.160}La_{0.020}Nd_{0.040}Rh_{0.003}$ Oxide containing Rh as composition and supporting Rh.

The powder had an Rh content ratio of 0.5% by weight.

(2) Production Example 2

Production of $Ce_{0.50}Zr_{00.45}Y_{0.05}$ Oxide Powder

A mixed alkoxide solution was prepared by mixing 0.1 mol, in terms of Ce, of cerium methoxypropylate [$Ce(OCH(CH_3)CH_2OCH_3)_3$], 0.09 mol, in terms of Zr, of zirconium methoxypropylate [$Zr(OCH(CH_3)CH_2OCH_3)_3$], 0.01 mol, in terms of Y, of yttrium methoxypropylate [$Y(OCH(CH_3)CH_2OCH_3)_3$], and 200 mL of toluene, and dissolving them with stirring. The mixed alkoxide solution was hydrolyzed by adding dropwise 80 mL of deionized water.

Next, the resulting hydrolyzed solution was evaporated to dryness by distilling off toluene and deionized water to obtain a precursor. The precursor was further subjected to forced-air drying at 60° C. for 24 hours, and then subjected to a heat treatment (baking) at 450° C. for 3 hours using an electric furnace, to obtain a powder of ceria composite oxide represented by $Ce_{0.50}Zr_{0.45}Y_{0.05}$ Oxide.

(3) Production Example 3

Production of Pt/$Ce_{0.50}Zr_{0.45}Y_{0.05}$ Oxide Powder

The $Ce_{0.50}Zr_{0.45}Y_{0.05}$ Oxide powder obtained in Production Example 2 was impregnated with an aqueous dinitrodiamine platinum nitrate solution, dried and then subjected to a heat treatment (baking) at 600° C. for 3 hours using an electric furnace, to obtain a powder of Pt-supporting ceria composite oxide represented by Pt-supporting $Ce_{0.50}Zr_{0.45}Y_{0.05}$ Oxide.

The amount of Pt supported on this powder was 0.1 g per 30 g of the powder.

(4) Production Example 4

Production of Pt/$Ce_{0.50}Zr_{0.45}Y_{0.05}$ Oxide Powder)

A powder of Pt-supporting ceria composite oxide represented by Pt-supporting $Ce_{0.50}Zr_{0.45}Y_{0.05}$ Oxide was obtained by the same procedures as in Production Example 3, except that the amount of Pt supported (supporting ratio) was changed to 0.05 g per 30 g of the powder.

(5) Production Example 5

Production of $La_{1.02}Fe_{0.95}Pd_{0.05}O_{3\pm\delta}$" Powder

A mixed alkoxide solution was prepared by charging 0.102 mol, in terms of La, of lanthanum ethoxyethylate [$La(OC_2H_4OEt)_3$] and 0.095 mol, in terms of Fe, of iron ethoxyethylate [$Fe(OC_2H_4OEt)_3$] in a 500-mL round-bottomed flask, adding 200 mL of toluene thereto, and dissolving them with stirring. A homogeneous mixing solution containing La, Fe, and Pd was prepared by dissolving 0.005 mol, in terms of Pd, of palladium acetylacetonate [$Pd^{II}(acac)_2$] in 100 mL of toluene, and adding the resulting solution to the mixed alkoxide solution in the above-mentioned round-bottomed flask.

The resulting solution was then hydrolyzed by adding dropwise 200 mL of deionized water into the above-mentioned round-bottomed flask over approximately 15 minutes, to produce a brown viscous precipitate. Then, the solution containing the viscous precipitate was further stirred at room temperature for 2 hours.

Next, toluene and water were distilled off under reduced pressure to obtain a precursor of LaFePd composite oxide. The precursor was transferred to a Petri dish, subjected to forced-air drying at 60° C. for 24 hours, and then subjected to a heat treatment (baking) at 800° C. in the atmosphere for 1 hour using an electric furnace, to obtain a dark brown powder of perovskite-type composite oxide containing Pd as composition represented by $La_{1.02}Fe_{0.95}Pd_{0.05}O_{3\pm\delta}'''$.

The powder had a Pd content of 2.15% by weight.

(6) Production Example 6

Production of Pt—Rh/O—$Al_2O_3$ Powder

A θ-alumina was impregnated with an aqueous dinitrodiamine platinum nitrate solution, dried and then subjected to a heat treatment (baking) at 600° C. for 3 hours using an electric furnace to obtain a Pt-supporting θ-alumina powder.

Next, the Pt-supporting θ-alumina powder thus obtained was impregnated with an aqueous rhodium nitrate solution, dried and then subjected to a heat treatment (baking) at 600° C. for 3 hours using an electric furnace, to obtain a Pt—Rh supporting θ-alumina powder.

The amount of Pt and Rh supported on this powder was 0.2 g and 0.1 g, respectively, per 90 g of the powder.

(7) Production Example 7

Production of Pt—Rh/θ-$Al_2O_3$ Powder

A Pt—Rh-supporting θ-alumina powder was obtained by the same procedures as in Production Example 6, except that the amount of Pt and Rh supported (supporting ratio) was changed to 0.3 g and 0.25 g, respectively, per 90 g of the powder.

(8) Production Example 8

Production of $Ca_{0.95}Zr_{0.99}Pt_{0.01}O_{3\pm\delta}$ Powder

A mixed alkoxide solution was prepared by charging 0.095 mol, in terms of Ca, of calcium isopropoxide [$Ca^{II}(OCH(CH_3)_2)_2$] and 0.099 mol, in terms of Zr, of zirconium methoxypropylate [$Zr(OCH(CH_3)CH_2OCH_3)_3$] in a 500-mL round-bottomed flask, adding 200 mL of toluene thereto, and dissolving them with stirring. The mixed alkoxide solution was then hydrolyzed by adding dropwise 200 mL of deionized water thereto, to produce a white viscous precipitate. Then, toluene was distilled off from the mixed alkoxide solution to obtain an aqueous slurry solution, and thereafter, 0.001 mol, in terms of Pt, of an aqueous dinitrodiamine platinum nitrate solution was added to the aqueous slurry solution, and stirred at room temperature for 1 hour.

Next, the resulting mixture was evaporated to dryness by distilling off water under reduced pressure to obtain a precursor. The precursor was further subjected to a heat treatment (baking) at 800° C. in the atmosphere for 1 hour using an electric furnace, to obtain a brown powder of perovskite-type composite oxide containing Pt as composition represented by $Ca_{0.95}Zr_{0.99}Pt_{0.01}O_{3\pm\delta}$.

The powder had a Pt content ratio of 1.10% by weight (0.1 g of Pt per 9.1 g of the powder).

(9) Production Example 9

Production of $Ca_{0.80}Zr_{0.98}Pt_{0.02}O_{3+\delta}$ Powder

A brown powder of perovskite-type composite oxide containing Pt as composition represented by $Ca_{0.80}Zr_{0.98}Pt_{0.02}O_{3+\delta}$ was obtained by the same procedures as in Production Example 8, except that the amount of the calcium isopropoxide was changed to 0.080 mol, in terms of Ca, the amount of the zirconium methoxypropylate was changed to 0.098 mol, in terms of Zr, and the amount of the aqueous dinitrodiamine platinum nitrate solution to be added to the aqueous slurry solution was changed to 0.002 mol, in terms of Pt, in the preparation of the mixed alkoxide solution.

The powder had a Pt content ratio of 2.27% by weight (0.1 g of Pt per 4.4 g of the powder).

(10) Production Example 10

Production of $Ca_{1.02}Zr_{0.99}Pt_{0.01}O_{3+\delta}$ Powder

A brown powder of perovskite-type composite oxide containing Pt as composition represented by $Ca_{1.02}Zr_{0.99}Pt_{0.01}O_{3+\delta}$ was obtained by the same procedures as in Production Example 8, except that the amount of the calcium isopropoxide was changed to 0.102 mol, in terms of Ca, in the preparation of the mixed alkoxide solution.

The powder had a Pt content ratio of 1.08% by weight (0.1 g of Pt per 9.3 g of the powder).

(11) Production Example 11

Production of $Ca_{0.98}Zr_{0.98}Pt_{0.02}O_{3+\delta}$ Powder

A brown powder of perovskite-type composite oxide containing Pt as composition represented by $Ca_{0.98}Zr_{0.98}Pt_{0.02}O_{3+\delta}$ was obtained by the same procedures as in Production Example 8, except that the amount of the calcium isopropoxide was changed to 0.098 mol, in terms of Ca, the amount of the zirconium methoxypropylate was changed to 0.098 mol, in terms of Zr, and the amount of the aqueous dinitrodiamine platinum nitrate solution to be added to the aqueous slurry solution was changed to 0.002 mol, in terms of Pt, in the preparation of the mixed alkoxide solution.

The powder had a Pt content ratio of 2.17% by weight (0.1 g of Pt per 4.6 g of the powder).

(12) Production Example 12

Production of $Sr_{0.90}Zr_{0.97}Pt_{0.03}O_{3+\delta}$ Powder

A mixed alkoxide solution was prepared by charging 0.09 mol, in terms of Sr, of strontium isopropoxide [$Sr^{II}(OCH(CH_3)_2)_2$] and 0.097 mol, in terms of Zr, of zirconium methoxypropylate [$Zr(OCH(CH_3)CH_2OCH_3)_3$] in a 500-mL round-bottomed flask, adding 200 mL of toluene thereto, and dissolving them with stirring. The mixed alkoxide solution was then hydrolyzed by adding dropwise 200 mL of deionized water thereto, to produce a white viscous precipitate. Then, toluene was distilled off from the mixed alkoxide solution to obtain an aqueous slurry solution, and thereafter, 0.003 mol, in terms of Pt, of an aqueous dinitrodiamine platinum nitrate solution was added to the aqueous slurry solution, and stirred at room temperature for 1 hour.

Next, the resulting mixture was evaporated to dryness by distilling off water under reduced pressure to obtain a precursor. The precursor was further subjected to a heat treatment (baking) at 800° C. in the atmosphere for 1 hour using an electric furnace, to obtain a brown powder of perovskite-type composite oxide containing Pt as composition represented by $Sr_{0.90}Zr_{0.97}Pt_{0.03}O_{3+\delta}$.

The powder had a Pt content ratio of 2.63% by weight (0.1 g of Pt per 3.8 g of the powder).

(13) Production Example 13

Production of $Ca_{0.980}Ti_{0.993}Rh_{0.007}O_{3+\delta}$ Powder

A mixed alkoxide solution was prepared by charging 0.098 mol, in terms of Ca, of calcium isopropoxide [$Ca^{II}(OCH(CH_3)_2)_2$] and 0.0993 mol, in terms of Ti, of titanium isopropoxide [$Ti^{IV}(OCH(CH_3)_2)_4$] in a 500-mL round-bottomed flask, adding 200 mL of toluene thereto, and dissolving them with stirring. The mixed alkoxide solution was then hydrolyzed by adding dropwise 200 mL of deionized water thereto, to produce a white viscous precipitate. Then, toluene was distilled off from the mixed alkoxide solution to obtain an aqueous slurry solution, and thereafter, 0.0007 mol, in terms of Rh, of an aqueous rhodium nitrate solution was added to the aqueous slurry solution, and stirred at room temperature for 1 hour.

Next, the resulting mixture was evaporated to dryness by distilling off water under reduced pressure to obtain a precursor. The precursor was further subjected to a heat treatment (baking) at 950° C. in the atmosphere for 2 hours using an electric furnace, to obtain a brown powder of perovskite-type composite oxide containing Rh as composition represented by $Ca_{0.980}Ti_{0.993}Rh_{0.007}O_{3+\delta}$.

The powder had an Rh content ratio of 0.532% by weight (0.05 g of Rh per 9.4 g of the powder).

(14) Production Example 14

Production of $Ca_{1.010}Ti_{0.993}Rh_{0007}O_{3+\delta}$ Powder

A brown powder of perovskite-type composite oxide containing Rh as composition represented by $Ca_{1.010}Ti_{0.993}Rh_{0.007}O_{3+\delta}$ was obtained by the same procedures as in Production Example 13, except that the amount of the calcium isopropoxide was changed to 0.101 mol, in terms of Ca, in the preparation of the mixed alkoxide solution.

The powder had an Rh content ratio of 0.526% by weight (0.05 g of Rh per 9.5 g of the powder).

(15) Production Example 15

Production of $Ca_{0.980}Ti_{0.985}Rh_{0.015}O_{3+\delta}$ Powder

A brown powder of perovskite-type composite oxide containing Rh as composition represented by $Ca_{0.980}Ti_{0.985}Rh_{0.015}O_{3+\delta}$ was obtained by the same procedures as in Production Example 13, except that the amount of the titanium isopropoxide was changed to 0.0993 mol, in terms of Ti, and the amount of the aqueous rhodium nitrate solution to be added to the aqueous slurry solution was changed to 0.0015 mol, in terms of Rh, in the preparation of the mixed alkoxide solution.

The powder had an Rh content ratio of 1.136% by weight (0.05 g of Rh per 4.4 g of the powder).

(16) Production Example 16

Production of $Ba_{0.98}Ti_{0.98}Rh_{0.02}O_{3+\delta}$ Powder

A mixed alkoxide solution was prepared by charging 0.098 mol, in terms of Ba, of barium isopropoxide [$Ba^{II}(OCH(CH_3)_2)_2$] and 0.098 mol, in terms of Ti, of titanium isopropoxide [$Ti^{IV}(OCH(CH_3)_2)_4$] in a 500-mL round-bottomed flask, adding 200 mL of toluene thereto, and dissolving them with stirring. The mixed alkoxide solution was then hydrolyzed by adding dropwise 200 mL of deionized water thereto, to produce a white viscous precipitate. Then, toluene was distilled off from the mixed alkoxide solution to obtain an aqueous slurry solution, and thereafter, 0.002 mol, in terms of Rh, of an aqueous rhodium nitrate solution was added to the aqueous slurry solution, and stirred at room temperature for 1 hour.

Next, the resulting mixture was evaporated to dryness by distilling off water under reduced pressure to obtain a precursor. The precursor was further subjected to a heat treatment (baking) at 950° C. in the atmosphere for 2 hours using an electric furnace, to obtain a brown powder of perovskite-type composite oxide containing Rh as composition represented by $Ba_{0.98}Ti_{0.98}Rh_{0.02}O_{3+\delta}$.

The powder had an Rh content ratio of 0.892% by weight (0.05 g of Rh per 5.6 g of the powder).

(17) Example 1

The $La_{1.02}Fe_{0.95}Pd_{0.05}O_{3+\delta''}$ powder obtained in Production Example 5, the Pt-supporting $Ce_{0.50}Zr_{0.45}Y_{0.05}$ Oxide powder obtained in Production Example 3, and the $\theta$-$Al_2O_3$ powder were mixed and pulverized in a ball mill, and distilled water was added thereto to prepare a slurry. The slurry was applied to the inner surfaces of cells of a monolithic carrier, dried, and then baked at 600° C. for 3 hours to form an inner layer.

The above-mentioned inner layer was formed so that the monolithic carrier individually supported, per 1 liter thereof, 13.8 g (Pd content: 0.3 g) of the $La_{1.02}Fe_{0.95}Pd_{0.05}O_{3+\delta''}$ powder, 30 g (Pt content: 0.1 g) of the Pt-supporting $Ce_{0.50}Zr_{0.45}Y_{0.05}$ Oxide powder, and 93.83 g of the $\theta$-$Al_2O_3$ powder.

Next, the Rh-supporting $Zr_{0.777}Ce_{0.160}La_{0.020}Nd_{0.040}Rh_{0.003}$ Oxide powder obtained in Production Example 1, the Pt-supporting $Ce_{0.50}Zr_{0.45}Y_{0.05}$ Oxide powder obtained in Production Example 4, the Pt—Rh-supporting $\theta$-$Al_2O_3$ powder obtained in Production Example 6, and the $Ca_{0.980}Ti_{0.993}Rh_{0.007}O_{3+\delta}$ powder obtained in Production Example 13 were mixed and pulverized in a ball mill, and distilled water was added thereto to prepare a slurry. The slurry was applied to the surface of the inner layer on the above-mentioned monolithic carrier, dried, and then baked at 600° C. for 3 hours to form an outer layer, so that a composite oxide layer was formed.

The above-mentioned outer layer was formed so that the monolithic carrier individually supported, per 1 liter thereof, 40 g (Rh content: 0.2 g) of the Rh-supporting $Zr_{0.777}Ce_{0.160}La_{0.020}Nd_{0.040}Rh_{0.003}$ Oxide powder, 30 g (Pt content: 0.05 g) of the Pt-supporting $Ce_{0.50}Zr_{0.45}Y_{0.05}$ Oxide powder, 90 g (Pt content: 0.2 g; Rh content: 0.1 g) of the Pt—Rh-supporting $\theta$-$Al_2O_3$ powder, and 9.4 g (Rh content: 0.05 g) of the $Ca_{0.980}Ti_{0.993}Rh_{0.007}O_{3+\delta}$ powder.

The above-mentioned monolithic carrier was further immersed in an aqueous mixed solution of dinitrodiamine platinum nitrate and rhodium nitrate prepared so that the monolithic carrier supported, per 1 liter thereof, 0.35 g of Pt and 0.35 g of Rh, to impregnate the monolithic carrier with the aqueous mixed solution, dried and then subjected to a heat treatment (baking) at 600° C. for 3 hours using an electric furnace, so that Pt and Rh were supported on the surfacemost of the monolithic carrier, to thereby form a noble-metal layer made of Pt and Rh on the surfacemost of the monolithic carrier.

Thus, a monolithic catalyst made of a composite oxide layer and a noble-metal layer was obtained. The monolithic catalyst thus obtained theoretically has a Pt, an Rh, and a Pd content of 0.7 g/L, 0.7 g/L, and 0.3 g/L, respectively, per 1 liter of the monolithic carrier.

(18) Comparative Example 1

A monolithic catalyst made of a composite oxide layer and a noble-metal layer was obtained by the same procedures as in Example 1, except that the $Ca_{1.010}Ti_{0.993}Rh_{0.007}O_{3+\delta}$ powder obtained in Production Example 14 was used in place of the $Ca_{0.980}Ti_{0.993}Rh_{0.007}O_{3+\delta}$ powder obtained in Production Example 13, and the monolithic carrier individually supported, per 1 liter thereof, 9.5 g (Rh content: 0.05 g) of the $Ca_{1.010}Ti_{0.993}Rh_{0.007}O_{3+\delta}$ powder, in the formation of the outer layer.

(19) Example 2

The $La_{1.02}Fe_{0.95}Pd_{0.05}O_{3+\delta"}$ powder obtained in Production Example 5, the Pt-supporting $Ce_{0.50}Zr_{0.45}Y_{0.05}$ Oxide powder obtained in Production Example 3, and the $\theta\text{-}Al_2O_3$ powder were mixed and pulverized in a ball mill, and distilled water was added thereto to prepare a slurry. The slurry was applied to the inner surfaces of cells of a monolithic carrier, dried, and then baked at 600° C. for 3 hours to form an inner layer.

The above-mentioned inner layer was formed so that the monolithic carrier individually supported, per 1 liter thereof, 13.8 g (Pd content: 0.3 g) of the $La_{1.02}Fe_{0.95}Pd_{0.05}O_{3+\delta"}$ powder, 30 g (Pt content: 0.1 g) of the Pt-supporting $Ce_{0.50}Zr_{0.45}Y_{0.05}$ Oxide powder, and 93.83 g of the $\theta\text{-}Al_2O_3$ powder.

Next, the Rh-supporting $Zr_{0.777}Ce_{0.160}La_{0.020}Nd_{0.040}Rh_{0.003}$ Oxide powder obtained in Production Example 1, the Pt—Rh-supporting $\theta\text{-}Al_2O_3$ powder obtained in Production Example 7, the $Ca_{0.95}Zr_{0.99}Pt_{0.01}O_{3+\delta}$ powder obtained in Production Example 8, and the $Ca_{0.980}Ti_{0.985}Rh_{0.015}O_{3+\delta}$ powder obtained in Production Example 15 were mixed and pulverized in a ball mill, and distilled water was added thereto to prepare a slurry. The slurry was applied to the surface of the inner layer on the above-mentioned monolithic carrier, dried, and then baked at 600° C. for 3 hours to form an outer layer, so that a composite oxide layer was formed.

The above-mentioned outer layer was formed so that the monolithic carrier individually supported, per 1 liter thereof, 40 g (Rh content: 0.2 g) of the Rh-supporting $Zr_{0.777}Ce_{0.160}La_{0.020}Nd_{0.040}Rh_{0.003}$ Oxide powder, 90 g (Pt content: 0.3 g; Rh content: 0.25 g) of the Pt—Rh-supporting $\theta\text{-}Al_2O_3$ powder, 9.1 g (Pt content: 0.1 g) of the $Ca_{0.95}Zr_{0.99}Pt_{0.01}O_{3+\delta}$ powder, and 4.4 g (Rh content: 0.05 g) of the $Ca_{0.980}Ti_{0.985}Rh_{0.015}O_{3+\delta}$ powder.

The above-mentioned monolithic carrier was further immersed in an aqueous mixed solution of dinitrodiamine platinum nitrate and rhodium nitrate prepared so that the monolithic carrier supported, per 1 liter thereof, 0.1 g of Pt and 0.4 g of Rh, to impregnate the monolithic carrier with the aqueous mixed solution, dried and then subjected to a heat treatment (baking) at 600° C. for 3 hours using an electric furnace, so that Pt and Rh were supported on the surfacemost of the monolithic carrier, to thereby form a noble-metal layer made of Pt and Rh on the surfacemost of the monolithic carrier.

Thus, a monolithic catalyst made of a composite oxide layer and a noble-metal layer was obtained. The monolithic catalyst thus obtained theoretically has a Pt, an Rh, and a Pd content of 0.7 g/L, 0.9 g/L, and 0.3 g/L, respectively, per 1 liter of the monolithic carrier.

(20) Example 3

A monolithic catalyst made of a composite oxide layer and a noble-metal layer was obtained by the same procedures as in Example 2, except that the $Ca_{0.80}Zr_{0.98}Pt_{0.02}O_{3+\delta}$ powder obtained in Production Example 9 was used in place of the $Ca_{0.95}Zr_{0.99}Pt_{0.01}O_{3+\delta}$ powder obtained in Production Example 8, and the monolithic carrier individually supported, per 1 liter thereof, 4.4 g (Pt content: 0.1 g) of the $Ca_{0.80}Zr_{0.98}Pt_{0.02}O_{3+\delta}$ powder on the outer layer, in the formation of the outer layer.

(21) Example 4

A monolithic catalyst made of a composite oxide layer and a noble-metal layer was obtained by the same procedures as in Example 2, except that the $Ca_{1.02}Zr_{0.99}Pt_{0.01}O_{3+\delta}$ powder obtained in Production Example 10 was used in place of the $Ca_{0.95}Zr_{0.99}Pt_{0.01}O_{3+\delta}$ powder obtained in Production Example 8, the $Ca_{0.980}Ti_{0.993}Rh_{0.00}O_{3+\delta}$ powder obtained in Production Example 13 was used in place of the $Ca_{0.980}Ti_{0.985}Rh_{0.015}O_{3+\delta}$ powder obtained in Production Example 15, and the monolithic carrier individually supported, per 1 liter thereof, 9.3 g (Pt content: 0.1 g) of the $Ca_{1.02}Zr_{0.99}Pt_{0.01}O_{3+\delta}$ powder and 9.4 g (Rh content: 0.05 g) of the $Ca_{0.980}Ti_{0.993}Rh_{0.007}O_{3+\delta}$ powder, in the formation of the outer layer.

(22) Example 5

A monolithic catalyst made of a composite oxide layer and a noble-metal layer was obtained by the same procedures as in Example 2, except that the $Ca_{1.010}Ti_{0.993}Rh_{0.0070}O_{3+\delta}$ powder obtained in Production Example 14 was used in place of the $Ca_{0.980}Ti_{0.985}Rh_{0.015}O_{3+\delta}$ powder obtained in Production Example 15, and the monolithic carrier supported, per 1 liter thereof, 9.5 g (Rh content: 0.05 g) of the $Ca_{1.010}Ti_{0.993}Rh_{0.007}O_{3+\delta}$ powder, in the formation of the outer layer.

(23) Comparative Example 2

A monolithic catalyst made of a composite oxide layer and a noble-metal layer was obtained by the same procedures as in Example 2, except that the $Ca_{1.02}Zr_{0.99}Pt_{0.01}O_{3+\delta}$ powder obtained in Production Example 10 was used in place of the $Ca_{0.95}Zr_{0.99}Pt_{0.01}O_{3+\delta}$ powder obtained in Production Example 8, the $Ca_{1.010}Ti_{0.993}Rh_{0.007}O_{3+\delta}$ powder obtained in Production Example 14 was used in place of the $Ca_{0.980}Ti_{0.985}Rh_{0.015}O_{3+\delta}$ powder obtained in Production Example 15, and the monolithic carrier individually supported, per 1 liter thereof, 9.3 g (Pt content: 0.1 g) of the $Ca_{1.02}Zr_{0.99}Pt_{0.01}O_{3+\delta}$ powder and 9.5 g (Rh content: 0.05 g) of the $Ca_{1.010}Ti_{0.993}Rh_{0.007}O_{3+\delta}$ powder, in the formation of the outer layer.

(24) Example 6

A monolithic catalyst made of a composite oxide layer and a noble-metal layer was obtained by the same procedures as in Example 2, except that the $Ca_{0.98}Zr_{0.98}Pt_{0.02}O_{3+\delta}$ powder obtained in Production Example 11 was used in place of the $Ca_{0.95}Zr_{0.99}Pt_{0.01}O_{3+\delta}$ powder obtained in Production Example 8, the $Ba_{0.98}Ti_{0.98}Rh_{0.02}O_{3+\delta}$ powder obtained in Production Example 16 was used in place of the $Ca_{0.980}Ti_{0.985}Rh_{0.015}O_{3+\delta}$ powder obtained in Production Example 15, and the monolithic carrier individually supported, per 1 liter thereof, 4.6 g (Pt content: 0.1 g) of the $Ca_{0.98}Zr_{0.98}Pt_{0.02}O_{3+\delta}$ powder and 5.6 g (Rh content: 0.05 g) of the $Ba_{0.8}Ti_{0.98}Rh_{0.02}O_{3+\delta}$ powder, in the formation of the outer layer.

(25) Example 7

A monolithic catalyst made of a composite oxide layer and a noble-metal layer was obtained by the same procedures as in Example 2, except that the $Sr_{0.90}Zr_{0.97}Pt_{0.03}O_{3+\delta}$ powder obtained in Production Example 12 was used in place of the $Ca_{0.95}Zr_{0.99}Pt_{0.01}O_{3+\delta}$ powder obtained in Production Example 8, and the monolithic carrier supported, per 1 liter thereof, 3.8 g (Pt content: 0.1 g) of the $Sr_{0.90}Zr_{0.97}Pt_{0.03}O_{3+\delta}$ powder, in the formation of the outer layer.

Evaluation (1) Measurement of Supporting Efficiency on the Noble Metal Layer

The aqueous mixed solution of dinitrodiamine platinum nitrate and rhodium nitrate after immersion (impregnation) of the monolithic carrier in the formation of the noble-metal layer in each of Examples and Comparative Examples was quantitatively analyzed by inductively coupled plasma (ICP) emission spectrometry and the residual amount of Pt and Rh were calculated. Then, a supporting efficiency of the noble metal on the noble-metal layer was calculated by the following equation:

$$\text{Supporting Efficiency (\%)} = \frac{\text{Charged Amount of Noble Metal} - \text{Residual Amount of Noble Metal}}{\text{Charged Amount of Noble Metal}} \times 100$$

The charged amount of the noble metal was calculated from the concentration of the above-mentioned aqueous mixed solution prepared in the formation of the noble-metal layer.

The results are shown in Table 1. In Table 1, numerical values in parentheses ([ ]) in the columns of "Composition" of "Composite Oxide-Containing Layer" represent supporting weight (g) of the composite oxide on each layer.

TABLE 1

| Ex./Comp. Ex. | Layer | Composite Oxide-Containing Layer Composition | Noble-Metal Layer Supporting Efficiency (%) Pt/Rh |
|---|---|---|---|
| Ex. 1 | Inner | $La_{1.02}Fe_{0.95}Pd_{0.05}O_{3+\delta}"[13.8] + Pt/Ce_{0.50}Zr_{0.45}Y_{0.05}Oxide[30] + \theta\text{-}Al_2O_3[93.83]$ | 99.23/99.67 |
|  | Outer | $Rh/Zr_{0.777}Ce_{0.160}La_{0.020}Nd_{0.040}Rh_{0.003}Oxide[40] + Pt/Ce_{0.50}Zr_{0.45}Y_{0.05}Oxide[30] + Pt\text{—}Rh/\theta\text{-}Al_2O_3[90] + Ca_{0.980}Ti_{0.993}Rh_{0.007}O_{3+\delta}[9.4]$ |  |
| Comp. Ex. 1 | Inner | $La_{1.02}Fe_{0.95}Pd_{0.05}O_{3+\delta}"[13.8] + Pt/Ce_{0.50}Zr_{0.45}Y_{0.05}Oxide[30] + \theta\text{-}Al_2O_3[93.83]$ | 96.90/95.70 |
|  | Outer | $Rh/Zr_{0.777}Ce_{0.160}La_{0.020}Nd_{0.040}Rh_{0.003}Oxide[40] + Pt/Ce_{0.50}Zr_{0.45}Y_{0.05}Oxide[30] + Pt\text{—}Rh/\theta\text{-}Al_2O_3[90] + Ca_{1.010}Ti_{0.993}Rh_{0.007}O_{3+\delta}[9.5]$ |  |
| Ex. 2 | Inner | $La_{1.02}Fe_{0.95}Pd_{0.05}O_{3+\delta}"[13.8] + Pt/Ce_{0.50}Zr_{0.45}Y_{0.05}Oxide[30] + \theta\text{-}Al_2O_3[93.83]$ | 99.20/99.60 |
|  | Outer | $Rh/Zr_{0.777}Ce_{0.160}La_{0.020}Nd_{0.040}Rh_{0.003}Oxide[40] + Pt\text{—}Rh/\theta\text{-}Al_2O_3[90] + Ca_{0.95}Zr_{0.99}Pt_{0.01}O_{3+\delta}[9.1] + Ca_{0.980}Ti_{0.985}Rh_{0.015}O_{3+\delta}[4.4]$ |  |
| Ex. 3 | Inner | $La_{1.02}Fe_{0.95}Pd_{0.05}O_{3+\delta}"[13.8] + Pt/Ce_{0.50}Zr_{0.45}Y_{0.05}Oxide[30] + \theta\text{-}Al_2O_3[93.83]$ | 99.40/99.80 |
|  | Outer | $Rh/Zr_{0.777}Ce_{0.160}La_{0.020}Nd_{0.040}Rh_{0.003}Oxide[40] + Pt\text{—}Rh/\theta\text{-}Al_2O_3[90] + Ca_{0.80}Zr_{0.98}Pt_{0.02}O_{3+\delta}[4.4] + Ca_{0.980}Ti_{0.985}Rh_{0.015}O_{3+\delta}[4.4]$ |  |
| Ex. 4 | Inner | $La_{1.02}Fe_{0.95}Pd_{0.05}O_{3+\delta}"[13.8] + Pt/Ce_{0.50}Zr_{0.45}Y_{0.05}Oxide[30] + \theta\text{-}Al_2O_3[93.83]$ | 96.80/96.10 |
|  | Outer | $Rh/Zr_{0.777}Ce_{0.160}La_{0.020}Nd_{0.040}Rh_{0.003}Oxide[40] + Pt\text{—}Rh/\theta\text{-}Al_2O_3[90] + Ca_{1.02}Zr_{0.99}Pt_{0.01}O_{3+\delta}[9.3] + Ca_{0.980}Ti_{0.993}Rh_{0.007}O_{3+\delta}[9.4]$ |  |
| Ex. 5 | Inner | $La_{1.02}Fe_{0.95}Pd_{0.05}O_{3+\delta}"[13.8] + Pt/Ce_{0.50}Zr_{0.45}Y_{0.05}Oxide[30] + \theta\text{-}Al_2O_3[93.83]$ | 95.90/96.40 |
|  | Outer | $Rh/Zr_{0.777}Ce_{0.160}La_{0.020}Nd_{0.040}Rh_{0.003}Oxide[40] + Pt\text{—}Rh/\theta\text{-}Al_2O_3[90] + Ca_{0.95}Zr_{0.99}Pt_{0.01}O_{3+\delta}[9.1] + Ca_{1.010}Ti_{0.993}Rh_{0.007}O_{3+\delta}[9.5]$ |  |
| Comp. Ex. 2 | Inner | $La_{1.02}Fe_{0.95}Pd_{0.05}O_{3+\delta}"[13.8] + Pt/Ce_{0.50}Zr_{0.45}Y_{0.05}Oxide[30] + \theta\text{-}Al_2O_3[93.83]$ | 89.10/85.00 |
|  | Outer | $Rh/Zr_{0.777}Ce_{0.160}La_{0.020}Nd_{0.040}Rh_{0.003}Oxide[40] + Pt\text{—}Rh/\theta\text{-}Al_2O_3[90] + Ca_{1.02}Zr_{0.99}Pt_{0.01}O_{3+\delta}[9.3] + Ca_{1.010}Ti_{0.993}Rh_{0.007}O_{3+\delta}[9.5]$ |  |
| Ex. 6 | Inner | $La_{1.02}Fe_{0.95}Pd_{0.05}O_{3+\delta}"[13.8] + Pt/Ce_{0.50}Zr_{0.45}Y_{0.05}Oxide[30] + \theta\text{-}Al_2O_3[93.83]$ | 99.10/99.30 |
|  | Outer | $Rh/Zr_{0.777}Ce_{0.160}La_{0.020}Nd_{0.040}Rh_{0.003}Oxide[40] + Pt\text{—}Rh/\theta\text{-}Al_2O_3 + Ca_{0.98}Zr_{0.98}Pt_{0.02}O_{3+\delta}[4.6] + Ba_{0.98}Ti_{0.98}Rh_{0.02}O_{3+\delta}[5.6]$ |  |
| Ex. 7 | Inner | $La_{1.02}Fe_{0.95}Pd_{0.05}O_{3+\delta}"[13.8] + Pt/Ce_{0.50}Zr_{0.45}Y_{0.05}Oxide[30] + \theta\text{-}Al_2O_3[93.83]$ | 99.20/99.40 |
|  | Outer | $Rh/Zr_{0.777}Ce_{0.160}La_{0.020}Nd_{0.040}Rh_{0.003}Oxide[40] + Pt\text{—}Rh/\theta\text{-}Al_2O_3 + Sr_{0.90}Zr_{0.97}Pt_{0.03}O_{3+\delta}[3.8] + Ca_{0.980}Ti_{0.985}Rh_{0.015}O_{3+\delta}[4.4]$ |  |

While the illustrative embodiments of the present invention are provided in the above description, such is for illustrative purpose only and it is not to be construed restrictively. Modification and variation of the present invention that will be obvious to those skilled in the art are to be covered by the following claims.

INDUSTRIAL APPLICABILITY

The catalyst of the present invention is used in various industrial fields, and, for example, used as a reaction catalyst for vapor or liquid phase. More specifically, the catalyst of the present invention is used as an organic synthesis reaction catalyst, a reductive reaction catalyst, a hydrogenation catalyst, a hydrogenolysis catalyst, or an exhaust gas purifying catalyst for internal combustion engines such as gasoline engines or diesel engines.

The invention claimed is:

1. A catalyst comprising:
   a composite oxide-containing layer comprising a perovskite-type composite oxide represented by the following general formula (1); and
   a noble-metal layer made of a noble metal supported on a surfacemost thereof:

$$A_xB_yO_{3\pm\delta} \quad (1)$$

(wherein A represents at least one element selected from rare earth elements and alkaline earth metals, which elements in combination represent the entire A component of formula (1); B represents at least one element selected from transition elements (excluding rare earth elements); x represents an atomic ratio of the entire A component and the x atomic ratio is less than 1 such that a combined atomic ratio of all A elements is less than 1; y represents an atomic ratio of 1.0; and δ represents an oxygen excess or an oxygen deficiency.)

2. The catalyst according to claim 1, wherein the perovskite-type composite oxide is represented by the following general formula (2):

$$A_xB_{1-z}N_zO_{3\pm\delta} \quad (2)$$

(wherein A represents at least one element selected from rare earth elements and alkaline earth metals, which elements in combination represent the entire A component of formula (2); B represents at least one element selected from transition elements (excluding rare earth elements and noble metals); N represents at least one element selected from noble metals; x represents an atomic ratio of the entire A component and the x atomic ratio is less than 1 such that a combined atomic ratio of all A elements is less than 1; z represents an atomic ratio satisfying the following condition: $0<z\leq0.5$; and δ represents an oxygen excess or an oxygen deficiency.)

3. The catalyst according to claim 1, wherein x in the general formula (1) represents an atomic ratio satisfying the following condition: $0.8\leq x<1.0$.

4. The catalyst according to claim 1, wherein A in the general formula (1) is at least one element selected from Ca, Sr, and Ba.

5. The catalyst according to claim 1, wherein B in the general formula (1) is at least one element selected from Ti and Zr.

6. The catalyst according to claim 2, wherein N in the general formula (2) is at least one element selected from Pt and Rh.

7. The catalyst according to claim 1, wherein an amount of the noble metal supported on the noble-metal layer is in a range of 0.05 to 0.7 g/L.

8. The catalyst according to claim 2, wherein $0<z\leq0.2$.

9. The catalyst according to claim 1, wherein x in the general formula (1) represents an atomic ratio satisfying the following condition: $0.9\leq x<1.0$.

* * * * *